United States Patent
Hommura

(10) Patent No.: US 7,311,989 B2
(45) Date of Patent: Dec. 25, 2007

(54) POLYMER MEMBRANE, PROCESS FOR ITS PRODUCTION AND MEMBRANE-ELECTRODE ASSEMBLY FOR SOLID POLYMER ELECTROLYTE FUEL CELLS

(75) Inventor: Satoru Hommura, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/042,516

(22) Filed: Jan. 26, 2005

(65) Prior Publication Data

US 2005/0214611 A1    Sep. 29, 2005

Related U.S. Application Data

(63) Continuation of application No. PCT/JP03/09394, filed on Jul. 24, 2003.

(30) Foreign Application Priority Data

Jul. 26, 2002    (JP) ............................. 2002-218225

(51) Int. Cl.
   *H01M 8/10*    (2006.01)
(52) U.S. Cl. .................. 429/30; 429/33; 429/314; 204/252; 521/27
(58) Field of Classification Search ................ 429/30, 429/33, 314; 521/27; 204/252
   See application file for complete search history.

(56) References Cited

U.S. PATENT DOCUMENTS

| | | | |
|---|---|---|---|
| 4,204,938 A * | 5/1980 | Bachot et al. ............. 204/252 |
| 6,692,858 B2 * | 2/2004 | Higuchi et al. ............. 429/33 |
| 2005/0214611 A1 | 9/2005 | Hommura | |

FOREIGN PATENT DOCUMENTS

| | | | |
|---|---|---|---|
| EP | 94679 | | 11/1983 |
| EP | 94679 A2 | * | 11/1983 |
| EP | 1139472 | | 10/2001 |
| EP | 1139472 A1 | * | 10/2001 |
| JP | 58-037030 | * | 3/1983 |
| JP | 58-201823 | | 11/1983 |
| JP | 63-037134 | | 2/1988 |
| JP | 06-231779 | | 8/1994 |
| JP | 2001-345111 | * | 12/2001 |
| JP | 2002-317058 | | 10/2002 |
| JP | 2003-051320 | | 2/2003 |
| JP | 2003-055568 | | 2/2003 |
| JP | 2003-197218 | | 7/2003 |

OTHER PUBLICATIONS

U.S. Appl. No. 11/030,295, filed Jan. 7, 2005, Terada, et al.
U.S. Appl. No. 11/092,908, filed Mar. 30, 2005, Hommura, et al.
U.S. Appl. No. 11/042,516, filed Jan. 26, 2005, Hommura.
U.S. Appl. No. 11/312,342, filed Dec. 21, 2005, Kotera, et al.

* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

The present invention provides a polymer membrane mainly made of an ion exchange resin which further comprises melt-spun fluororesin fibers such as fibers made of an ethylene-tetrafluoroethylene copolymer, a polyvinylidene fluoride or the like, having fiber diameters of from 0.01 to 20 μm, fiber lengths of from 1 μm to 10 mm and aspect ratios of at least 5 in an amount of from 1 to 40% based on the total mass. The polymer membrane is excellent in handleability and shows excellent dimensional stability when hydrated, and therefore a polymer electrolyte fuel cell provided with a membrane-electrode assembly having the polymer membrane as an electrolyte membrane has great durability.

9 Claims, No Drawings

POLYMER MEMBRANE, PROCESS FOR ITS PRODUCTION AND MEMBRANE-ELECTRODE ASSEMBLY FOR SOLID POLYMER ELECTROLYTE FUEL CELLS

TECHNICAL FIELD

The present invention relates to a polymer membrane for e.g. fuel cells and a membrane-electrode assembly for polymer electrolyte fuel cells using it.

BACKGROUND ART

The hydrogen-oxygen fuel cell receives attention as a power generating system having little adverse effect on the global environment because in principle, its reaction product is water only. Among fuel cells, polymer electrolyte fuel cells are greatly expected to be used practically, since their power density has improved with the remarkable research progress in recent years.

A polymer electrolyte fuel cell has a membrane-electrode assembly which comprises gas diffusion electrodes each having a catalyst layer containing a catalyst as the anode and the cathode and an electrolyte membrane bonded to (or in contact with) the cathode and the anode flanking on both sides of the electrolyte membrane. When a fuel gas and an oxidant gas containing oxygen are supplied to the anode and the cathode of a membrane-electrode assembly, respectively, electrochemical reactions proceed inside to generate electric energy.

To improve the performance of polymer electrolyte fuel cells, various methods for producing a membrane-electrode assembly have been studied so far, and, for example, the following methods are known.

(1) A method comprising depositing a catalyst directly on an electrolyte membrane (JP-B-58-47471).

(2) A method comprising preparing gas diffusion electrode sheets having catalytic power and bonding the gas diffusion electrode sheets to an electrolyte membrane (U.S. Pat. No. 3,134,697, U.S. Pat. No. 3,297,484 and JP-B-2-7398).

(3) A method for producing a membrane-electrode assembly comprising preparing two electrolyte membranes (half-cells) each having a catalyst layer formed thereon and bonding the electrolyte membranes under pressure with the electrolyte membrane sides face-to-face (JP-A-6-44984, JP-A-7-176317, etc.).

Especially, the method (2) is widely used because of its advantage that small amounts of the catalysts can be used effectively. As a specific example of the method (2), a method comprising forming catalyst layers on additional base films, and transferring the catalyst layers onto an electrolyte membrane by laminating the electrolyte membrane to the catalyst layers by hot pressing (hereinafter referred to as "the transfer method") was proposed. However, when a membrane-electrode assembly is produced by the transfer method using an electrolyte membrane thinner than 30 μm, because such a membrane has low mechanical and tensile strengths and therefore has problematic workability and handleability, the resulting membrane-electrode assembly having such an insufficiently durable electrolyte membrane has a problem that its properties remarkably deteriorate during long operation.

Particularly, when catalyst layers are formed by coating the gas diffusion layers with a coating solution, because the gas diffusion layers are usually made of porous carbon paper or carbon felt, some carbon fibers protruding from the surfaces of the gas diffusion layers bite into the catalyst layers, and further into the electrolyte membrane at the time of bonding the electrodes and the electrolyte membrane by hot pressing. Therefore, gas leakage tends to occur, the open circuit voltage of the membrane-electrode assembly tends to drop, and the anode and the cathode tend to short-circuit. Accordingly, this method hardly provides a membrane-electrode assembly using a thin electrolyte membrane and has limitation on how much output characteristics can be improved while maintaining good durability.

Further, attempts to increase the sulfonic acid group concentration in an electrolyte membrane have been made with a view to improving the performance of a membrane-electrode assembly by reducing the resistance of the electrolyte membrane. However, a drastic increase in the sulfonic acid group concentration in the membrane tends to deteriorate the mechanical and tensile strength of the membrane and tends to cause dimensional change due to atmospheric moisture when the membrane is handled. Further, a membrane-electrode assembly prepared by using such an electrolyte membrane vulnerable to creeping and insufficient in durability, remarkably deteriorates in terms of characteristics during long operation.

Further, an electrolyte membrane tends to cause various troubles upon hydration by swelling up in the longitudinal direction. For example, if a polymer electrolyte fuel cell provided with a membrane-electrode assembly is operated, the membrane swells up to a larger size with water produced by the reaction or water vapor supplied together with the fuel gas. Because the membrane is usually bonded to electrodes, the electrodes also undergo dimensional change after the membrane. The membrane-electrode assembly is usually bound to a separator having grooves formed as gas channels, and therefore, the membrane offsets its dimensional increase by wrinkling. The wrinkles can interrupt the gas flow by blocking the groove in the separator.

As a solution to the above-mentioned problems, a polytetrafluoroethylene (hereinafter referred to as PTFE) porous membrane impregnated with a fluorinated ion exchange polymer having sulfonic acid groups was proposed (JP-B-5-75835). However, being a relatively soft material, a porous PTFE does not have sufficient reinforcing effect and falls short of a solution to the above-mentioned problems. Further, a porous polyolefin filled with an ion exchange resin was proposed (JP-B-7-68377). However, there is a problem in long-term stability because the chemical resistance is insufficient.

DISCLOSURE OF THE INVENTION

Accordingly, in order to solve the problems of the above-mentioned prior arts, the present invention provides a polymer membrane excellent in handleability properties, durability and output characteristics showing excellent dimensional stability when hydrated, and further provides a membrane-electrode assembly for stable and high power polymer electrolyte fuel cells, which comprises the polymer membrane as an electrolyte membrane.

The present invention provides a polymer membrane mainly made of an ion exchange resin which further comprises melt-spun fluororesin fibers having fiber diameters of from 0.01 to 20 μm, fiber lengths of from 1 μm to 10 mm and aspect ratios of at least 5 in an amount of from 1 to 40% based on the total mass, and a polymer electrolyte fuel cell comprising a membrane-electrode assembly having the polymer membrane as an electrolyte and gas diffusion electrodes each containing a catalyst provided on both sides of the polymer membrane.

Further, the present invention provides a process for producing a polymer membrane which comprises preparing a dispersion A by dissolving or dispersing an ion exchange resin in a solvent or a dispersion medium, mixing the dispersion A with melt-spun fluororesin fibers having fiber diameters of from 0.01 to 20 µm, fiber lengths of from 1 µm to 10 mm and aspect ratios of at least 5 to obtain a dispersion B, coating a base film with the dispersion B and drying.

BEST MODE FOR CARRYING OUT THE INVENTION

The melt-spun fluororesin fibers in the present invention (hereinafter referred to as the present fibers) are contained in a polymer membrane as a reinforcement for the polymer membrane and have fiber diameters of from 0.01 to 20 µm, fiber lengths of from 1 µm to 10 mm and aspect ratios of at least 5. If the fiber diameters are less than 0.01 µm, the reinforcing effect will be insufficient, and if they are more than 20 µm, it will be difficult to form a thin polymer membrane. The fiber diameters are preferably from 0.1 to 10 µm. Further, the present fibers preferably have fiber diameters of at most ½ of the thickness of the polymer membrane because a polymer membrane excellent in surface properties can be obtained. The fiber diameters are particularly preferably at most ⅓ of the thickness of the polymer membrane.

As the present fibers become longer, the fibers have stronger reinforcing effect and become more effective for improving the mechanical strength. On the other hand, if the fibers are too long, the moldability tends to be poor. Accordingly, the above range is employed in the present invention. The filter lengths are particularly preferably from 10 µm to 5 mm. Further, if the aspect ratios are less than 5, the reinforcing effect will be insufficient. The aspect ratios are particularly preferably from 10 to 1,000.

The polymer membrane of the present invention contains the present fibers in an amount of from 1 to 40%, preferably of from 1 to 30%, in terms of the mass ratio to the total mass of the membrane. If the content of the present fibers is less than 1%, the reinforcing effect will be insufficient, and if it is more than 40%, the moldability will be poor. It is particularly preferably from 4 to 10%.

The present fibers may be any fibers obtained by melt-spinning a fluororesin which melts by heating and can be formed into fibers. Specifically, the fluororesin is preferably at least one member selected from the group consisting of an ethylene-tetrafluoroethylene copolymer (hereinafter referred to as ETFE. The same applies hereinafter), a tetrafluoroethylene-perfluoro(alkyl vinyl ether) copolymer (PFA), a tetrafluoroethylene-hexafluoropropylene copolymer (FEP), a polychlorotrifluoroethylene (PCTFE), an ethylene-chlorotrifluoroethylene copolymer (ECTFE), a polyvinylidene fluoride polymer (PVDF) and a polyvinyl fluoride polymer (PVF). Further, polymer blends of these polymers or other copolymers containing polymerization units constituting these polymers can also be used.

Among these fluororesins, ETFE, PFA, FEP and PVDF are preferred, and ETFE is particularly preferred because of its excellent mechanical strength and moldability. ETFE comprising polymerization units derived from tetrafluoroethylene (hereinafter referred to as TFE) and polymerization units derived from ethylene in a molar ratio of from 70/30 to 30/70, particularly preferably of from 65/35 to 40/60 is particularly preferred.

The above-mentioned ETFE, PFA, FEP and PVDF may contain a small amount of polymerization units derived from comonomers. The comonomers may, for example, be fluoroethylenes (except TFE) such as $CF_2=CFCl$; fluoropropylenes such as $CF_2=CFCF_3$ and $CF_2=CHCF_3$; (perfluoroalkyl)ethylenes having a $C_{2-12}$ perfluoroalkyl group such as $CF_3CF_2CF_2CF_2CH=CH_2$ and $CF_3CF_2CF_2CF_2CF=CH_2$; perfluorovinyl ethers such as $R^f(OCFXCF_2)_mOCF=CF_2$ (wherein $R^f$ is a $C_{1-6}$ perfluoroalkyl group, X is a fluorine atom or a trifluoromethyl group, and m is an integer of from 0 to 5); perfluorovinyl ethers having a group readily convertible into a carboxylic acid group or a sulfonic acid group such as $CH_3OC(=O)CF_2CF_2CF_2OCF=CF_2$ and $FSO_2CF_2CF_2OCF(CF_3)CF_2OCF=CF_2$; and olefins other than ethylene such as C3 olefins represented by propylene and C4 olefins represented by butylene and isobutylene.

If polymerization units derived from such comonomers as mentioned above are contained, they are usually contained in ETFE, PFA, FEP or PVDF in a ratio preferably of at most 30 mol %, more preferably of from 0.1 to 15 mol %, particularly preferably of from 0.2 to 10 mol %.

The present fibers are preferably subjected to at least one treatment selected from the group consisting of irradiation with radioactive rays, plasma exposure and chemical treatment using metallic sodium. Such treatments can improve adhesion between the ion exchange resin as a matrix and fibers as a reinforcement at the interface therebetween because polar groups such as —COOH groups, —OH groups and —COF groups are introduced onto fiber surfaces, and as a result, improve the reinforcing effects.

The present fibers can be obtained by various methods without any particular restrictions, for example, by kneading a resin with a single- or double-screw extruder into pellets, extruding the pellets into fibers with the single- or double-screw extruder, and then drawing down the fibers to a prescribed fiber diameter with a puller.

The ion exchange resin of the present invention is preferably a cation exchange resin made of a perfluorocarbon polymer having sulfonic acid groups in view of the durability in a fuel cell, and the cation exchange resin may be a cation exchange resin made of a hydrocarbon polymer or a partially fluorinated hydrocarbon polymer. The ion exchange resin in the polymer membrane may be a single ion exchange resin or a mixture of at least two ion exchange resins.

As the perfluorocarbon polymer having sulfonic acid groups, a variety of known polymers may be used. Especially, it is preferably a copolymer of a perfluorovinyl compound represented by the general formula $CF_2=CF(OCF_2CFX)_m—O_p—(CF_2)_nSO_3H$ (wherein X is a fluorine atom or a trifluoromethyl group, m is an integer of from 0 to 3, n is an integer of from 0 to 12, and p is 0 or 1 provided that when n=0, p=0) with a perfluoroolefin, a perfluoroalkyl vinyl ether or the like. Specific examples of the perfluorovinyl compound are compounds represented by any of the following formulae 1 to 4. In the following formulae, q is an integer of from 0 to 9, r is an integer of from 1 to 8, s is an integer of from 0 to 8, and z is 2 or 3.

$CF_2=CFO(CF_2)_qSO_3H$     Formula 1

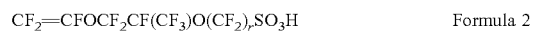

$CF_2=CFOCF_2CF(CF_3)O(CF_2)_rSO_3H$     Formula 2

$CF_2=CF(CF_2)_sSO_3H$     Formula 3

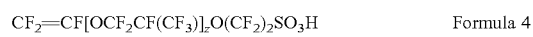

$CF_2=CF[OCF_2CF(CF_3)]_zO(CF_2)_2SO_3H$     Formula 4

The polymer comprising polymerization units derived from a perfluorovinyl compound having a sulfonic acid group is usually obtained by polymerization of a perfluorovinyl compound having a —SO$_2$F group and then converting the —SO$_2$F groups into —SO$_3$H groups. The perfluorovinyl compound having a —SO$_2$F group is usually copolymerized with a comonomer such as a perfluoroolefin or a perfluoro(alkyl vinyl ether) because it is unlikely to undergo radical polymerization, though it may be polymerized alone. As the perfluoroolefin used as a comonomer, for example, tetrafluoroethylene, hexafluoropropylene or the like may be mentioned. Usually, the use of tetrafluoroethylene is preferred.

The perfluoro(alkyl vinyl ether) as a comonomer is preferably a compound represented by CF$_2$=CF—(OCF$_2$CFY)$_t$—O—R$^f$ wherein Y is a fluorine atom or a trifluoromethyl group, t is an integer of from 0 to 3, and R$^f$ is a linear or branched perfluoroalkyl group represented by C$_u$F$_{2u+1}$ (1≦u≦12), more specifically, a compound represented by any of the formulae 5 to 7. In the following formulae, v is an integer of from 1 to 8, w is an integer of from 1 to 8, and x is 2 or 3.

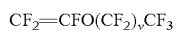CF$_2$=CFO(CF$_2$)$_v$CF$_3$            Formula 5

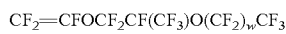CF$_2$=CFOCF$_2$CF(CF$_3$)O(CF$_2$)$_w$CF$_3$            Formula 6

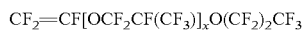CF$_2$=CF[OCF$_2$CF(CF$_3$)]$_x$O(CF$_2$)$_2$CF$_3$            Formula 7

In addition to a perfluoroolefin or a perfluoro(alkyl vinyl ether), other fluorine-containing monomers such as 1,1,2,3,3,4,4-heptafluoro-4-[(trifluoroethenyl)oxy]-1-butene may be copolymerized with the perfluorovinyl compound having a —SO$_2$F group as a comonomer.

As a polymer other than the perfluorocarbon polymer, which may be contained in the polymer membrane of the present invention, a polymer comprising polymerization units represented by the formula 8 and polymerization units represented by the formula 9 may, for example, be mentioned. Here, P$^1$ is a phenyltriyl group, a biphenyltriyl group, a naphthalenetriyl group, a phenanthrenetriyl group or an anthracenetriyl group, P$^2$ is a phenylene group, a biphenylene group, a naphthylene group, a phenanthrylene group or an anthracylene group, A$^1$ is a —SO$_3$M group (wherein M is a hydrogen atom or an alkali metal atom, hereinafter the same applies), a —COOM group or a group hydrolysable thereto, and B$^1$ and B$^2$ are independently oxygen atoms, sulfur atoms, sulfonyl groups or isopropylidene groups, provided that the structural isomerism of P$^1$ and P$^2$ is not particularly restricted, and at least one hydrogen atom in each of P$^1$ and P$^2$ may be substituted by a fluorine atom, a chlorine atom, a bromine atom or an alkyl group having from 1 to 3 carbon atoms.

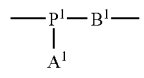

Formula 8

Formula 9

In the present invention, the ion exchange capacity of the ion exchange resin as a constituent of the polymer membrane is preferably from 0.5 to 2.0 meq/g dry resin, particularly preferably from 0.7 to 1.6 meq/g dry resin, considering that the polymer membrane is used as an electrolyte membrane in a fuel cell. If the ion exchange capacity is too low, the resistance tends to be large, while if the ion exchange capacity is too high, the affinity for water tends to be so strong that the electrolyte membrane may dissolve during power generation.

Further, the polymer membrane of the present invention preferably has a thickness of from 5 to 500 μm, and considering that it is used as an electrolyte membrane in fuel cell, the polymer membrane preferably has a thickness of from 20 to 100 μm, particularly preferably of from 30 to 70 μm. If the polymer membrane is too thin, fibers may make defects which can cause troubles such as gas leakage. On the other hand, if the polymer membrane is too thick, the membrane resistance becomes so large that the performance tends to deteriorate.

The polymer membrane of the present invention can be prepared by various methods, but is preferably obtained by mixing melt-spun fluororesin fibers with a dispersion A having an ion exchange resin dissolved or dispersed to prepare a dispersion B; coating a base film with the dispersion B as a coating solution for a polymer membrane; and drying the coating solution to vaporize the liquid components. Selection of the ion exchange resin concentration or the liquid (solvent or dispersion medium) in the coating solution for a polymer membrane (dispersion B) allows adjustment of the thickness of the resulting ion exchange membrane. In order to obtain a thick ion exchange membrane, the coating solution may be applied and dried repeatedly to a prescribed film thickness.

The coating method is not particularly limited, and specific examples include batch methods such as bar coating, spin coating and screen printing and continuous methods such as premetered methods and postmetered methods. In a postmetered method, a coating solution is applied in excess, and the excess of the coating solution is removed to a prescribed thickness. In a premetered method, the exact amount of a coating solution required to attain a prescribed thickness is applied.

Postmetered methods include, for example, air doctor coating, blade coating, rod coating, knife coating, squeeze coating, dip coating and comma coating. Premetered methods include, for example, die coating, reverse roll coating, transfer roll coating, gravure coating, kiss-roll coating, cast coating, spray coating, curtain coating, calender coating and extrusion coating. In order to form a uniform ion exchange membrane on a catalyst layer, screen printing and die coating are preferred, and continuous die coating is preferred in view of production efficiency.

It is necessary for the solvent (dispersion medium) contained in the coating solution for a polymer membrane to dissolve or suitably disperse an ion exchange resin, and the preferred solvent varies with the ion exchange resin. The solvent may be a single solvent or a mixture of at least two solvents. However, the solvent is preferred not to contain a low-boiling solvent having a boiling point of 50° C. or below, because vaporization of the low-boiling solvent changes the composition of the coating solution before or during the application of the coating solution and makes it difficult to control the thickness of the coating layer.

For example, when a perfluorocarbon polymer having sulfonic acid groups is contained in the coating solution, alcohols or fluorine containing solvents are preferably used as solvents (dispersion media). Specific examples are given below.

As alcohols, those having C$_{1-4}$ main chains such as methyl alcohol, ethyl alcohol, n-propyl alcohol, isopropyl alcohol and tert-butyl alcohol are preferably used. Further, addition of water to alcohols increases solubility of the ion exchange resin.

Examples of fluorinated solvents are given below.

Hydrofluorocarbons such as 2H-perfluoropropane, 1H,4H-perfluorobutane, 2H,3H-perfluoropentane, 3H,4H- perfluoro(2-methylpentane), 2H,5H-perfluorohexane and 3H-perfluoro(2-methylpentane).

Fluorocarbons such as perfluoro(1,2-dimethylcyclobutane), perfluoroctane, perfluoroheptane and perfluorohexane.

Hydrochlorofluorocarbons such as 1,1-dichloro-1-fluoroethane, 1,1,1-trifluoro-2,2-dichloroethane, 3,3-dichloro-1,1,1,2,2-pentafluoropropane and 1,3-dichloro-1,1,2,2,3-pentafluoropropane.

Fluoroethers such as 1H,4H,4H-perfluoro(3-oxapentane) and 3-methoxy-1,1,1,2,3,3-hexafluoropropane.

Fluorinated alcohols such as 2,2,2-trifluoroethanol, 2,2,3,3,3-pentafluoro-1-propanol and 1,1,1,3,3,3-hexafluoro-2-propanol.

Further, when a fluorine-free ion exchange resin is contained in the coating solution, solvents such as N,N-dimethylformamide (DMF), dimethyl sulfoxide (DMSO), methylene chloride, chloroform, tetrachloromethane, 1,1,1-trichloroethane, 1,1,2-trichloroethane, trichloroethylene and tetrachloroethylene may be used.

Further, the solid content of the coating solution for a polymer membrane may be selected so as to suit the desired thickness of the polymer membrane with no particular restrictions. However, the solid content is preferably from 1 to 50%, particularly preferably from 5 to 35% in terms of the mass ratio to the total mass of the coating solution. If the solid content is too low, cracking tends to occur during drying of the coating layer. On the other hand, if the solid content is too high, the coating solution has too high a viscosity to apply evenly.

The base film to be coated with the coating solution is required not to dissolve in the coating solution and not to melt at the time of drying of the coating solution. Particularly, films made of the following materials are preferably used.

Fluorine-free polymers such as polyethylene terephthalate (hereinafter referred to as PET), polyethylene, polypropylene (hereinafter referred to as PP) and polyimide. Fluorine polymers such as polytetrafluoroethylene, an ethylene/tetrafluoroethylene copolymer, an ethylene/hexafluoropropylene copolymer, a tetrafluoroethylene/perfluoro(alkyl vinyl ether) copolymer and polyvinylidene fluoride.

Further, because the base film is eventually peeled from the coating layer, it is required to peel from the polymer membrane properly. From this point of view, the base film is preferably made of a fluorine polymer. Further, in the case of a film made of a fluorine-free polymer, the surface is preferably treated with a silicone releasant, a fluorine-type releasant or the like, and PET with a releasant-treated surface may, for example, be used.

The coating solution for a polymer membrane applied to a base may be dried by any methods without any particular restrictions, but is preferably dried by heating at or above the softening temperature of the ion exchange resin, preferably continuously for efficient production of a polymer membrane. Particularly, it is preferred to pass the base through an oven maintained at from 100 to 200° C. for a retention time of from 3 minutes to 2 hours.

In the present invention, the coating solution for a polymer membrane may be prepared by any methods without particular restrictions, but is preferably obtained by bundling melt-spun fluororesin fibers by dipping in the dispersion A having an ion exchange resin dissolved or dispersed, cutting the fluororesin fibers, and adding the fluororesin fibers to the dispersion A having an ion exchange resin dissolved or dispersed to obtain the dispersion B, namely the coating solution for a polymer membrane.

Fibers having small diameters are preferred to be put together into bundles because they are difficult to handle. The fiber bundles are dipped in the dispersion A containing an ion exchange resin so as to infiltrate the dispersion A between the fibers and heated to vaporize the solvent components of the dispersion A. Because the ion exchange resin between the fibers serves as a binder to bundle them, the fiber handleability improves, and fibers can be cut with easy operation in the subsequent step. Further, when fibers are added to the dispersion A containing an ion exchange resin for preparation of the coating solution for a polymer membrane, the fibers disintegrate easily, and therefore a coating solution excellent in dispersibility can be obtained.

The fibers may be cut by any methods without any particular restrictions, and are preferably cut into constant lengths continuously with an apparatus such as a pelletizer. Further, for continuous production, it is preferred to continuously carry out a series of steps consisting of fiber formation by an extruder, drawing down by a puller, dipping in the dispersion A for bundling, drying and cutting.

The polymer electrolyte fuel cell of the present invention has a membrane-electrode assembly comprising a polymer membrane reinforced with the above-mentioned fibers as an electrolyte membrane and gas diffusion electrodes provided on both sides of the polymer membrane. The gas diffusion electrodes usually have catalyst layers containing catalysts and an ion exchange resin in contact with the electrolyte membrane. Further, the gas diffusion electrodes have gas diffusion layers made of carbon cloth or carbon paper on the other sides of the catalyst layers which are out of contact with the electrolyte membrane. The membrane-electrode assembly can be obtained by usual methods, for example, as described below. First, an electroconductive carbon black powder carrying platinum or platinum alloy catalyst particles and a solution of a perfluorocarbon polymer having sulfonic acid groups are mixed to obtain a uniform dispersion, and gas diffusion electrodes are formed by e.g. the following methods to obtain a membrane-electrode assembly.

One method comprises applying the dispersion on both sides of an electrolyte membrane, drying the dispersion and then bonding two carbon cloths or carbon papers onto both sides of the electrolyte membrane. Another method comprises applying the dispersion on two carbon cloths or carbon papers, drying the dispersion, and then interposing the electrolyte membrane between them so as to bond the electrolyte membrane to the dispersion-coated sides of the carbon cloths or the carbon papers. The carbon cloths or carbon papers function not only as gas diffusion layers to secure uniform gas diffusion throughout the layers containing catalysts but also as current collectors.

The resulting membrane-electrode assembly is interposed between separators having grooves as channels for a fuel gas or an oxidant gas (a gas containing oxygen), and then mounted in a cell to obtain a polymer electrolyte fuel cell. The separators may be electroconductive carbon plates.

In the polymer electrolyte fuel cell obtained as mentioned above, hydrogen gas is supplied to the anode, and oxygen or air is supplied to the cathode. On the anode, the reaction represented as $H_2 \rightarrow 2H^+ + 2e^-$ proceeds, and on the cathode, the reaction represented as $\frac{1}{2}O_2 + 2H^+ + 2e^- \rightarrow H_2O$ proceeds to convert chemical energy into electric energy.

Now, the present invention will be described in detail with reference to Examples (Examples 1 to 9) and Comparative Examples (Examples 10 to 13). However, it should be understood that the present invention is by no means restricted thereto.

EXAMPLE 1

Pellets of an ethylene/tetrafluoroethylene/C4 olefin terpolymer (tradename: AFLON COPC-88AX, manufactured by Asahi Glass Co., Ltd.) were supplied to a single-screw extruder having a bore diameter of 40 mm (tradename: VS40, manufactured by IKEGAI Corporation), and then extruded at a die temperature of 330° C. at an extrusion rate of 1 kg/hr through a die having 50 holes with a diameter of 0.1 mm. The resulting extrudate was drawn down by a puller to obtain melt-spun continuous fibers (reinforcement) with fiber diameters of 15 μm.

The resulting fibers were dipped in a liquid mixture (solid content of 9 mass %) of a copolymer consisting of polymerization units derived from $CF_2=CF_2$ and polymerization units derived from $CF_2=CFOCF_2CF(CF_3)OCF_2CF_2SO_3H$ (with an ion exchange capacity of 1.1 meq/g dry resin; hereinafter referred to as resin a) and ethanol, and impregnated therewith. Then, the fibers were heated in an oven at 130° C. for 3 minutes to vaporize the liquid components and cut to lengths of 1 mm with a pelletizer.

The resulting chopped fiber bundles were added to a liquid mixture (solid content of 9 mass %) having the resin a and ethanol in an amount of 5% in terms of the mass ratio to the mass of the resin a, and the resulting mixture was stirred to obtain a coating solution for formation of an electrolyte membrane. This coating solution was applied on a PET film with a silicon releasant-treated surface by die coating and dried in an oven at 160° C. for 5 minutes to form a 50 μm-thick electrolyte membrane. The resulting electrolyte membrane was evaluated by the following methods, and the results are shown in Table 1.

Measurement of Tear Strength

Firstly, a 100 mm×100 mm square sample for measurement of tear strength was cut from an electrolyte membrane. Then, the sample was cut over 50 mm, i.e. from one edge to the center with a knife, and the resulting legs were spread apart vertically from the crotch. The end of each leg was fixed to the upper or lower chuck of a tensile tester, and the sample was torn at a rate of 500 mm/min. The tear strength was calculated by dividing the tearing load by the thickness of the electrolyte membrane (the tear strengths measured in the longitudinal direction and in the transverse direction were averaged).

Measurement of Dimensional Change upon Hydration

A 200 mm×200 mm square sample was cut from an electrolyte membrane and left standing for 16 hours at 25° C. in an atmosphere having a 50% humidity, and then the longitudinal and transverse dimensions of the sample were measured. Then, the sample was immersed in deionized water having a temperature of 25° C. for 1 hour, and the dimensions were measured similarly. The dimensional change was calculated from the elongation of the sample (the average of the longitudinal elongation and transverse elongation).

Measurement of Membrane Resistance

A 5 mm-wide strip specimen was cut from an electrolyte membrane and maintained in a thermohygrostat at a temperature of 80° C. and a relative humidity of 95% with five platinum wires (diameters: 0.2 mm) placed on it transversely in parallel at 5 mm intervals, and the AC impedance between platinum wires was measured under an alternating current with a frequency of 10 kHz to obtain the specific AC resistance. As the five platinum wires placed at 5 mm intervals afforded variety to the cathode-anode distance, the AC resistance was measured at cathode-anode distances of 5, 10, 15 and 20 mm. The specific resistance of the membrane was calculated from the slope of the plot of the cathode-anode distance vs. the resistance so as to exclude the influence of the contact resistance between the platinum wires and the membrane. The cathode-anode distance and the measured resistance showed a linear relation, and the effective resistance was calculated from the slope of the plot of them and the thickness.

Preparation and Evaluation of Fuel Cell

A fuel cell is assembled as follows. First, the resin a and a platinum-loaded carbon are mixed in a mass ratio of 1:3 and mixed with ethanol to prepare a coating solution. Then, the coating solution is applied on both sides of an electrolyte membrane by die coating and dried to form 10-μm thick catalyst layers having a platinum content of 0.5 mg/cm$^2$ on both sides of the membrane. Further, carbon cloths are put as gas diffusion layers on both sides to obtain a membrane-electrode assembly. Further, carbon plates having narrow zigzag grooves as gas channels cut by machining are put on both sides as separators, and then heaters are put onto the outer surfaces to assemble a polymer electrolyte fuel cell having an effective membrane surface area of 25 cm$^2$.

Under such measurement conditions that air is supplied to the cathode, and hydrogen is supplied to the anode at 0.15 Mpa, respectively at a constant fuel cell temperature of 80° C., measurements of the cell voltages at current densities of 0.1 A/cm$^2$ and 1 A/cm$^2$, respectively, give the results shown in Table 1.

EXAMPLE 2

An electrolyte membrane was prepared and evaluated in the same manner as in Example 1 except that the fiber diameters of the fibers as a reinforcement are changed to 10 μm, and the thickness of the electrolyte membrane was changed to 30 μm. The results are shown in Table 1.

EXAMPLE 3

An electrolyte membrane is prepared in the same manner as in Example 2 except that the fiber diameters of the fibers as a reinforcement are changed to 5 mm and evaluated in the same manner as in Example 1. The results are shown in Table 1.

EXAMPLE 4

An electrolyte membrane is prepared in the same manner as in Example 3 except that the amount of fibers in the coating solution for formation of an electrolyte membrane is changed to 10% in terms of the mass ratio to the mass of the resin a and evaluated in the same manner as in Example 1. The results are shown in Table 1.

EXAMPLE 5

An electrolyte membrane was prepared and evaluated in the same manner as in Example 2 except that the continuous fibers were irradiated with γ-rays at 10 kGy for surface treatment. The results are shown in Table 1.

EXAMPLE 6

Fibers as a reinforcement were prepared in the same manner as in Example 1 except that fibers were prepared from PVDF, and the die temperature was changed to 250°

C., and an electrolyte membrane was prepared and evaluated in the same manner as in Example 1. The results are shown in Table 1.

EXAMPLE 7

Fibers as a reinforcement were prepared in the same manner as in Example 1 except that the fibers were prepared from PFA, and the die temperature was changed to 380° C., and an electrolyte membrane was prepared and evaluated in the same manner as in Example 1. The results are shown in Table 1.

EXAMPLE 8

An electrolyte membrane was prepared and evaluated in the same manner as in Example 7 except that the amount of fibers in the coating solution for formation of an electrolyte membrane was changed to 10% in terms of the mass ratio to the mass of the resin a. The results are shown in Table 1.

EXAMPLE 9

An electrolyte membrane was prepared and evaluated in the same manner as in Example 7 except that the amount of fibers in the coating solution for formation of an electrolyte membrane was changed to 20% in terms of the mass ratio to the mass of the resin a. The results are shown in Table 1.

EXAMPLE 10 (COMPARATIVE EXAMPLE)

An electrolyte membrane was prepared and evaluated in the same manner as in Example 1 except that the fiber diameters of fibers as a reinforcement were changed to 30 µm. The results are shown in Table 1. However, evaluation was impossible due to gas leakage during cell operation.

EXAMPLE 11 (COMPARATIVE EXAMPLE)

The procedure for preparation of an electrolyte membrane in Example 1 was followed except that the fiber lengths of fibers as a reinforcement were changed to 20 mm, but failed to give an electrolyte membrane because the die opening clogged with fibers during application of the coating solution for formation of an electrolyte membrane.

EXAMPLE 12 (COMPARATIVE EXAMPLE)

A liquid mixture (solid content of 9 mass %) of the resin a and ethanol was applied on a PET film with a silicone releasant-treated surface by die coating. Then, a PTFE porous body (tradename: Poreflon FP-010, manufactured by SUMITOMO ELECTRIC FINE POLYMER INC.) with a thickness of 20 µm was immediately impregnated with the coating layer. The coating layer was dried in an oven at 80° C. for 10 minutes and heated in the oven at 120° C. for 30 minutes to obtain a 30-µm thick electrolyte membrane reinforced with the PTFE porous body. The resulting electrolyte membrane was evaluated in the same manner as in Example 1. The results are shown in Table 1.

EXAMPLE 13 (COMPARATIVE EXAMPLE)

An electrolyte membrane was prepared and evaluated in the same manner as in Example 1 except that no fibers as a reinforcement were added. The results are shown in Table 1.

TABLE 1

| | Tear strength (N/mm) | Dimensional change on hydration (%) | Membrane resistance ($\Omega \cdot cm$) | Cell voltage (V) | |
|---|---|---|---|---|---|
| | | | | 1 A/cm$^2$ | 0.1 A/cm$^2$ |
| Ex. 1 | 5 | 4 | 8 | 0.70 | 0.51 |
| Ex. 2 | 5.5 | 4 | 6 | 0.73 | 0.62 |
| Ex. 3 | 6.5 | 3 | 5 | 0.73 | 0.65 |
| Ex. 4 | 8 | 2 | 9 | 0.70 | 0.49 |
| Ex. 5 | 9 | 3 | 5 | 0.74 | 0.66 |
| Ex. 6 | 6 | 4 | 8 | 0.71 | 0.53 |
| Ex. 7 | 4 | 4 | 7 | 0.70 | 0.50 |
| Ex. 8 | 6.5 | 2 | 8 | 0.69 | 0.49 |
| Ex. 9 | 8.5 | 0 | 9 | 0.68 | 0.48 |
| Ex. 10 | 5 | 3 | 9 | — | — |
| Ex. 11 | — | — | — | — | — |
| Ex. 12 | 4.5 | 7 | 7 | 0.72 | 0.58 |
| Ex. 13 | 0.5 | 15 | 7 | 0.72 | 0.64 |

INDUSTRIAL APPLICABILITY

According to the present invention, a mechanically strong, though thin, polymer membrane showing excellent dimensional stability when hydrated can be obtained. A membrane-electrode assembly obtained by using the polymer membrane as an electrolyte is excellent in handleability and stability, and therefore a polymer electrolyte fuel cell having high durability can be obtained.

The entire disclosure of Japanese Patent Application No. 2002-218225 filed on Jul. 26, 2002 including specification, claims and summary is incorporated herein by reference in its entirety.

What is claimed is:

1. A polymer membrane having a thickness of 50 µm or less, mainly made of an ion exchange resin which further comprises melt-spun fluororesin fibers having fiber diameters of from 0.01 to 20 µm, fiber lengths of from 1 µm to 10 mm and aspect ratios of at least 5 in an amount of from 1 to 40% based on the total mass, wherein the melt-spun fluororesin fibers are made of at least one member selected from the group consisting of an ethylene-tetrafluoroethylene copolymer, a tetrafluoroethylene-perfluoro(alkyl vinyl ether) polymer, and a tetrafluoroethylene-hexafluoropropylene copolymer.

2. The polymer membrane according to claim 1, wherein the fluororesin fibers have fiber diameters of at most ½ of the thickness of the polymer membrane.

3. The polymer membrane according to claim 1, wherein the ion exchange resin is a perfluorocarbon polymer having sulfonic acid groups.

4. The polymer membrane according to claim 2, wherein the ion exchange resin is a perfluorocarbon polymer having sulfonic acid groups.

5. The polymer membrane according to claim 1, wherein the polymer membrane has a thickness of at least 5 µm.

6. The polymer membrane according to claim 5, wherein the fluororesin fibers have fiber diameters of at most ½ of the thickness of the polymer membrane.

7. The polymer membrane according to claim 5, wherein the ion exchange resin is a perfluorocarbon polymer having sulfonic acid groups.

8. The polymer membrane according to claim 3, wherein the perfluorocarbon polymer is a copolymer comprising polymerization units derived from $CF_2=CF_2$ and polymerization units derived from $CF_2=CF-(OCF_2CFX)_m-O_p-$ $(CF_2)_n$—$SO_3H$ (wherein X is a fluorine atom or a trifluoromethyl group, m is an integer of from 0 to 3, n is an integer of from 0 to 12, and p is 0 or 1, provided that when n is 0, p is also 0).

9. The polymer membrane according to claim 7, wherein the perfluorocarbon polymer is a copolymer comprising polymerization units derived from $CF_2$=$CF_2$ and polymerization units derived from $CF_2$=$CF$—$(OCF_2CFX)_m$—$O_p$—$(CF_2)_n$—$SO_3H$ (wherein X is a fluorine atom or a trifluoromethyl group, m is an integer of from 0 to 3, n is an integer of from 0 to 12, and p is 0 or 1, provided that when n is 0, p is also 0).

* * * * *